US011328483B2

(12) United States Patent
Charvat et al.

(10) Patent No.: US 11,328,483 B2
(45) Date of Patent: May 10, 2022

(54) SYSTEM AND METHOD FOR STRUCTURE INSPECTION

(71) Applicants: Drone Technology LLC, Cincinnati, OH (US); Rawhide Intel Services Inc., Toledo, OH (US)

(72) Inventors: Robert Cesar Charvat, Cincinnati, OH (US); James Hillegas, Tallmadge, OH (US); Steven L. Mandell, Toledo, OH (US)

(73) Assignee: RAWHIDE INTEL SERVICES INC., Toledo, OH (US)

(*) Notice: Subject to any disclaimer, the term of this patent is extended or adjusted under 35 U.S.C. 154(b) by 162 days.

(21) Appl. No.: 16/830,395

(22) Filed: Mar. 26, 2020

(65) Prior Publication Data

US 2020/0312028 A1 Oct. 1, 2020

Related U.S. Application Data

(60) Provisional application No. 62/824,756, filed on Mar. 27, 2019.

(51) Int. Cl.
G06T 19/00 (2011.01)
G05D 1/00 (2006.01)
G06T 7/00 (2017.01)
G05D 1/10 (2006.01)

(52) U.S. Cl.
CPC ......... G06T 19/003 (2013.01); G05D 1/0094 (2013.01); G05D 1/101 (2013.01); G06T 7/0002 (2013.01); G06T 2200/24 (2013.01)

(58) Field of Classification Search
None
See application file for complete search history.

(56) References Cited

U.S. PATENT DOCUMENTS

| 8,369,610 | B1 | 2/2013 | Korobkin |
| 9,542,849 | B1* | 1/2017 | Bertram ............... G08G 5/0086 |
| 9,639,960 | B1 | 5/2017 | Loveland et al. |
| 9,734,397 | B1 | 8/2017 | Larson et al. |
| 9,996,746 | B1 | 6/2018 | Larson et al. |
| 10,055,831 | B2 | 8/2018 | Loveland et al. |
| 10,089,529 | B2 | 10/2018 | Larson et al. |
| 2002/0179865 | A1 | 12/2002 | Joffe |

(Continued)

FOREIGN PATENT DOCUMENTS

EP 2442284 B1 2/2015

Primary Examiner — Frank S Chen
(74) Attorney, Agent, or Firm — William J. Clemens; Shumaker, Loop & Kendrick, LLP

(57) ABSTRACT

A method for structure inspection includes the steps of: selecting a structure; providing a vehicle having an imaging device; moving the vehicle in proximity of the structure; capturing two-dimensional images of surfaces of the structure with the imaging device; storing the two-dimensional images, wherein each image includes associated position information related to the surface; producing a three-dimensional virtual model from the stored two-dimensional images; displaying the three-dimensional virtual model on a user device; selecting a location on the display of the three-dimensional model; using the selected location to identify a corresponding one of the stored position information associated with at least one of the two-dimensional images; and displaying the at least one two-dimensional image on the user device.

18 Claims, 14 Drawing Sheets

(56) References Cited

U.S. PATENT DOCUMENTS

| | | | |
|---|---|---|---|
| 2017/0206648 A1* | 7/2017 | Marra | G01C 21/20 |
| 2018/0130196 A1 | 5/2018 | Loveland et al. | |
| 2018/0367483 A1* | 12/2018 | Rodriguez | H04L 65/60 |
| 2019/0235491 A1* | 8/2019 | Ho | B64C 39/024 |
| 2021/0072737 A1* | 3/2021 | Li | G05B 17/02 |

* cited by examiner

SYSTEM AND METHOD FOR STRUCTURE INSPECTION

CROSS-REFERENCE TO RELATED APPLICATIONS

This application claims the benefit of U.S. provisional patent application Ser. No. 62/824,756, filed Mar. 27, 2019.

FIELD OF THE INVENTION

This invention relates to the inspection, measurement, evaluation, and documentation of buildings, bridges, power plants and other structures including civil infrastructure utilizing manned and unmanned vehicles.

BACKGROUND OF THE INVENTION

Current techniques for inspecting three-dimensional structures can be time consuming and subject to qualitative inaccuracies due to the variable judgment of human inspectors. Photographic techniques require intensive labor and can still yield inconsistent, qualitative data, as photos often lack texture, detail, and the ability to show views difficult to access. Further, the configuration and/or location of the structure can make it difficult to view all of the surfaces to be inspected.

Accordingly, there remains an unmet need for an apparatus, system, and method to provide effective photographic inspection of three-dimensional structures.

BRIEF SUMMARY OF THE INVENTION

A system and method for structure inspection includes the steps of: selecting a structure and surfaces of the structure to be inspected; providing a vehicle having an imaging device; controlling movement of the vehicle in proximity to the structure; capturing two-dimensional images of the selected surfaces; storing the captured two-dimensional images on digital storage media, wherein each image includes recorded and stored position information; producing a three-dimensional virtual model from the stored two-dimensional images; displaying the three-dimensional virtual model on a display device in real time; selecting a location of interest on the displayed three-dimensional model; marking the selected location to the stored position information of at least one of the two-dimensional images; and displaying the at least one of the two-dimensional images on the electronic device.

The term "structure", as used herein, includes man-made constructions and naturally occurring formations having surfaces to be inspected. Non-limiting examples of structures that are man-made constructions are: buildings; parking garages; fences; barrier walls; bridges; dams; water towers; communication towers; power lines; wind turbines; solar arrays; power stations; port facilities; manufacturing plants; and refineries. Non-limiting examples of structures that are naturally occurring formations are: cliffs and hillsides subject to dirt, rock and mud slides; ice accumulation; and a mass of snow subject to avalanche.

The term "vehicle", as used herein, includes any suitable means of conveyance over land, over and in water, and in the air. Non-limiting examples of suitable vehicles that can be manned or unmanned are: land vehicles (e.g., automobile, truck, all-terrain vehicle, tracked vehicle); water vehicles (e.g., boat, airboat; submersible); aerial vehicles (e.g., helicopter, blimp, balloon); and drone (unmanned aerial, land or water). In addition, a "vehicle" could be a person or an animal carrying the imaging device. In the following description, reference is made to an unmanned aerial vehicle (UAV) in the form of a drone as an example.

The term "sensor", as used herein, includes any suitable device sensitive to an environmental condition. Non-limiting examples of suitable sensors are: light sensors; temperature sensors; humidity sensors; radiation level sensors; pressure sensors; sound sensors; particulate sensors; and gas sensors. Such sensors can be mounted on the vehicle or mounted on the structure for sending an output signal to a receiver on the vehicle.

The invention relates to a method for structure inspection, the method comprising the steps of: selecting a structure having a surface to be inspected; providing a vehicle having an imaging device for generating two-dimensional digital images of the surface; providing a user device on which digital images can be viewed; moving the vehicle in proximity to the structure; generating digital images of a plurality of portions of the surface using the imaging device and, for each of the digital images, generating associated position information relating a position of the imaging device relative to a one of the portions of the surface represented by the digital image; storing the digital images in a data storage device, wherein each of the digital images includes the associated position information; producing a three-dimensional virtual model from the stored digital images; displaying the three-dimensional virtual model on the user device; selecting a location on the displayed three-dimensional model through the user device; using the selected location on the three-dimensional model to identify a corresponding one of the stored position information associated with at least one of the digital images; and displaying the at least one of the digital images on the user device.

A method for structure inspection, according to the invention, comprises the steps of: moving a vehicle in proximity to a structure, the vehicle having an imaging device generating digital images of a predetermined surface of the structure as a live stream video; providing a user device on which the video can be viewed; generating the video including a plurality of portions of the surface using the imaging device and, for each of the digital images, generating and including associated position information relating a position of the imaging device relative to a one of the portions of the surface represented by the digital image; and operating the user device to mark at least one point of interest in the video, the mark including an elapsed time of the video associated with the mark, a reference to the corresponding digital image and a user comment.

The invention relates to a computer-implemented method for structure inspection comprising executing on at least one processor the steps of: moving a vehicle in proximity to a structure and moving at least one of the vehicle and an imaging device on the vehicle to generate digital images of a predetermined surface of the structure in a predetermined pattern as a live stream video; generating the video including a plurality of portions of the surface using the imaging device and, for each of the digital images, generating and including associated position information relating a position of the imaging device relative to a one of the portions of the surface represented by the digital image; viewing the video on a user device; and operating the user device to mark at least one point of interest in the video, the mark including an elapsed time of the video associated with the mark and a reference to a corresponding one of the digital images and a user comment.

BRIEF DESCRIPTION OF THE SEVERAL VIEWS OF THE DRAWINGS

The present disclosure will be more readily understood from a detailed description of some example embodiments taken in conjunction with the following figures.

DETAILED DESCRIPTION OF THE INVENTION

Figure 1:
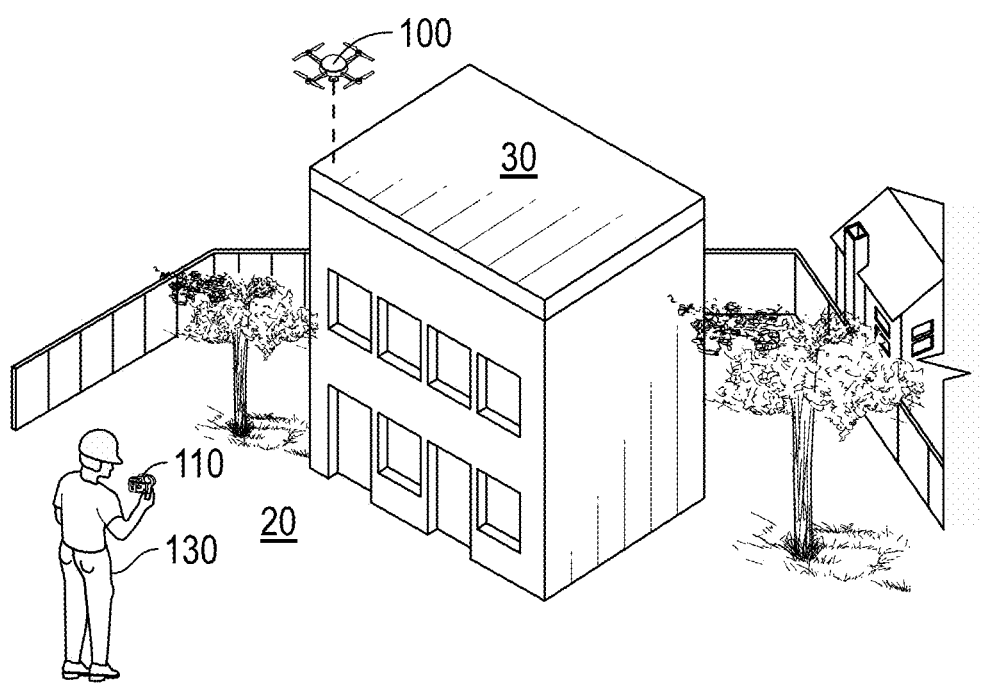
FIG. 1 depicts a perspective view of an embodiment of the system of the present disclosure inspecting a building structure.

The U.S. provisional patent application Ser. No. 62/824,756, filed Mar. 27, 2019, is incorporated herein by reference.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of a structure inspection system and methods of inspection. In embodiments, the inspection system can be automated and can be considered an Automated Civil Infrastructure Metrology System. In general, the method and system involved imaging all or a portion of surfaces of a structure, and analyzing the images. In general, the imaging can be achieved by digital imaging devices, such as digital photography. Digital image capture can be achieved by positioning a digital imaging device, such as a digital camera, in range to digitally capture the image of a structure. Placing a digital camera in range can be manually, such as by physically holding, aiming, and focusing a digital camera, such as in the hands of a photographer. Similarly, a photographer can hold a digital camera on the end of a stick or pole, or hang a digital camera by a flexible rope or cord. However, it is believed that the greatest advantage of the methods and systems of the present disclosure can be realized when digital imaging devices are deployed on a vehicle. In the following description, reference is made to an Unmanned Aerial Vehicle (UAV), which UAV can be a drone.

Referring to FIG. 1, there is shown an example of UAV 100 in the form of a drone performing inspection of a property 20 that includes a three-dimensional structure 30 such as a building or bridge. Although one UAV is shown and disclosed in the examples below, any number of UAV's, including of varying types, can be utilized for structure inspection. For example, two or more UAV's can be operated to inspect a given structure, with each of the UAV's gathering image information for later post-processing, as discussed below. In FIG. 1 the structure is a building, and the UAV can be controlled remotely by an operator 130 using a hand-held user device 110, and who may or may not be on the property 20 or near the structure 30. Further, the UAV 100 can be autonomous and can operate via a pre-programmed flight path. In general, the UAV 100 can be any unmanned vehicle, including lighter-than-air balloons, remote-controlled airplanes, helicopters, and the like. As used herein, UAV typically refers to a drone, and drone technology. In general, the inspection system can be utilized to inspect anything that can be captured on digitized images, e.g., property and structures. For simplicity herein, the present disclosure will be described with inspection of structures such as buildings, bridges, power plants, towers, and the like.

Figure 2:
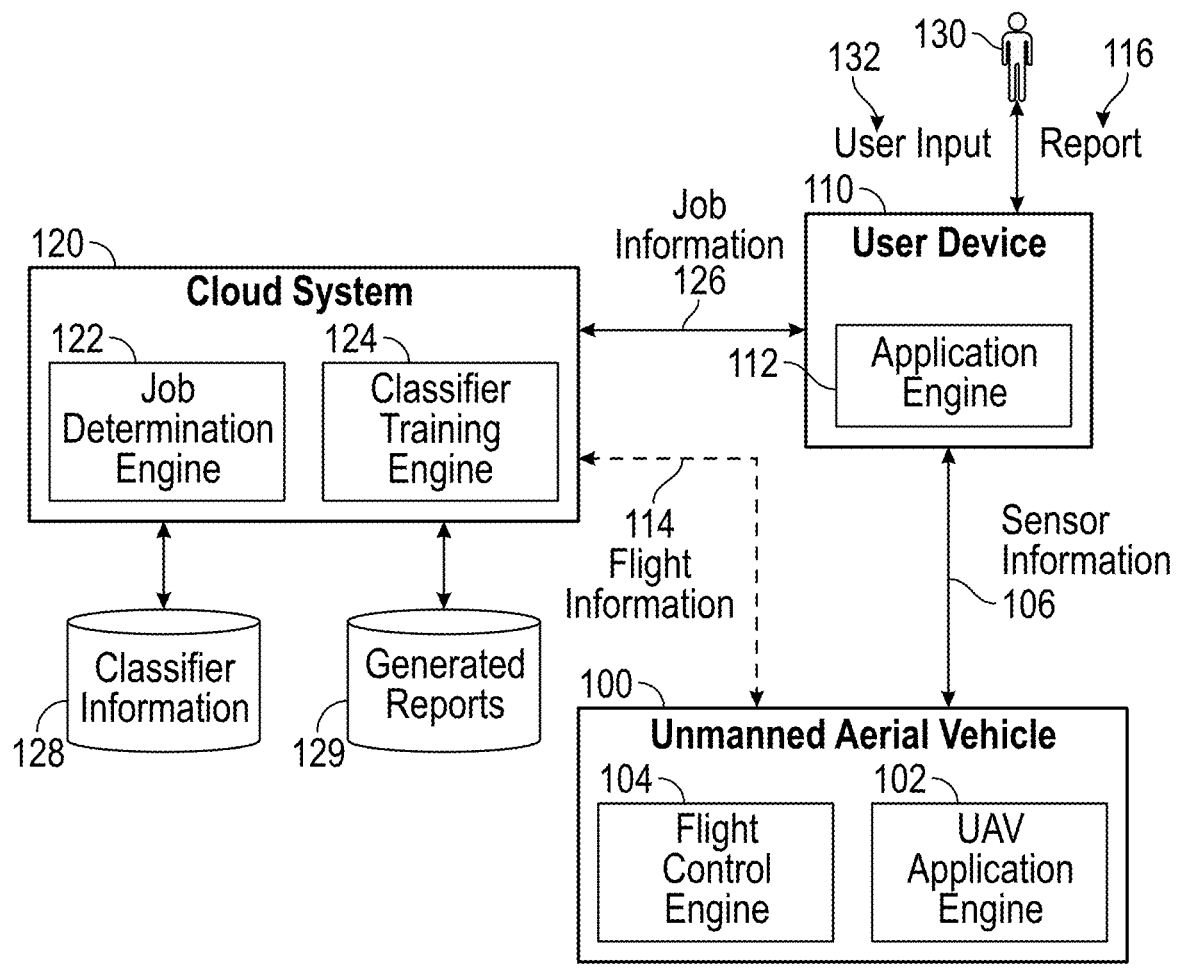
FIG. 2 depicts a block diagram of an example system utilized in performing inspections.

FIG. 2 illustrates a block diagram of a representative system utilized in performing structure inspections. The block diagram includes the user device 110 that can be in communication with the UAV 100 and a cloud system 120 (e.g., a system of one or more computers in communication with the user device 110 over a network, such as the Internet). Additionally, the UAV 100 can be optionally in communication with the cloud system 120 (e.g., over a network, such as the Internet, or through an intermediate system). The cloud system 120 can determine job information 126 describing one or more tasks to perform inspections of one or more structures, and the UAV 100 can perform inspections of the one or more structures.

The cloud system 120 can include a job determination engine 122 that can receive, or obtain, information describing jobs, and determine the job information 126. The job determination engine 122 can generate interactive user interfaces (e.g., web pages to be rendered by a user device) for presentation on a user device (e.g., the user device 110). An operator of the user device (e.g., operator 130 of user device 110) can provide (e.g., user input 132) information associated with a particular job in the interactive user interfaces.

In an embodiment, the operator 130 can enter an address of the structure 30 to be inspected, and the job determination engine 122 can obtain information describing the structure. The information can include, for example, property boundaries of the structure (e.g., from a database, or system that stores or can access property boundary information), geo-rectified imagery (e.g., satellite imagery) of the structure, and the like. The job determination engine 122 can determine a property geofence envelope for the UAV 100 to enforce (e.g., the UAV 100 can be required to remain within or substantially within the property boundaries of the property 20).

Similarly, the job determination engine 122 can receive information describing the structure 30 and portions of the structure to be inspected. The cloud system 120 can generate user interface data that includes imagery of the structure, and the user can indicate boundaries of the inspection. For instance, as described above, the user can select corners of a polygon that encompasses the structure (e.g., corners of the building structure). Also, a user can prescribe a given flight path, for example a "back and forth" "raster" pattern. In general, a flight pattern can be predetermined that ensures every area of interest of a subject structure is imaged.

The job determination engine 122 can receive information describing an expected type of damage, and information relevant to configuration information of the UAV 100 (e.g., information describing a type of UAV, sensors included in the UAV, and general functionality that can be performed by the UAV 100). For instance, the job determination engine 122 can receive information identifying that damage is expected, or is to be looked for, and can determine that a UAV which includes particular sensors, and specific visual classifiers to identify water damage, is needed (e.g., a heat and/or thermal imaging sensors, specific visual classifiers that can discriminate damage from other types of damage, rust damage, wind damage, hail damage, and so on).

The job determination engine 122 can receive a time that the job is to be performed (e.g., a particular day, a particular time at a particular day, a range of times, and so on). The job determination engine 122 can then determine an availability of UAVs and/or operators at the received time(s). Additionally, the job determination engine 122 can filter the available UAVs according to determined configuration information (e.g., as described above). Optionally, the job determination engine 122 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). UAV's can also be subject to flight clearances, including FAA flight restrictions. The job determination engine 122 can process such flight clearances.

The job determination engine 122 can then provide the determined job information 126 to the user device 110, and optionally directly to the UAV 100. For instance, the UAV 100 can be located in an area with a multitude of UAVs, and the cloud system 120 can select the UAV 100 (e.g., based off configuration information, availability, and so on). Optionally, the operator 130, via the user device 110, can override the cloud system UAV selection, and can instruct that the job be provided to a UAV selected by the operator. The UAV 100 can then receive the job information 126 (e.g., over a wired connection, or over a wireless connection such as Wi-Fi, BLUETOOTH, and so on).

The user device 110 can include an application engine 112 that can receive the job information 126, and can generate user interface data describing the job information 126. The operator 130 of the UAV 100 can travel to the property identified in the job information 126 with the UAV 100, and view information describing the job information 126 on the user device 110. Optionally, the application engine 112 can receive modifications, from the operator 130, to the job information 126, including updates to the rooftop boundary, and so on. Optionally, the application engine 112 can allow particular modifications (e.g., rooftop boundary), but not other modifications (e.g., the property boundary cannot be modified). The application engine 112 can receive information to effect the job, including a safe altitude (e.g., as illustrated in FIGS. 1A-1B), and safe take-off/landing locations (e.g., the application engine 112 can display imagery of the property 20, and the operator 130 can indicate the safe locations).

The application engine 112 can provide flight information 114 to the UAV 100, which is information sufficient to effect a safe inspection of the structure 30 according to the job information 126. For instance, the flight information 114 can include a geofence envelope determined from the property boundary, the safe altitude, boundaries of the structure, and so on. The flight information 114 can further include a flight plan for the UAV 100 to follow. For example, the application engine 112 can determine that the UAV 100 is to fly in a particular flight, such as a back and forth or up and down raster-like pattern, or a zig-zag, or other pattern, based on configuration information of the UAV 100 and the inputted safe altitude, including structure data on the structure being flown. That is, the application engine 112 can determine that based on the particular focal length, sensor resolution, and so on, of a camera included in the UAV 100 the legs of the flight pattern are to be a particular distance apart. In this way, the application engine 112 can determine that there will not be holes or gaps in the camera's coverage, such that the images of the structure can be stitched together (e.g., each image will contain enough visual information to identify subsequent and prior legs of the flight pattern), and that the entire structure can be imaged at a particular resolution (e.g., a particular number of pixels/distance of the structure surface). Advanced photogrammetry techniques for image stitching are available for analysis, especially around corners, where aligning markers (including windows, bricks facades, etc.) is difficult as well as the impact of changing altitudes, directions, and resolutions of the drone on the process.

The UAV 100 can receive the flight information 114 from the user device 110 (e.g., over a wired connection, or a wireless connection). The UAV 100 can include a UAV application engine 102 that can affect the flight information 114 that identifies the job to be performed. After obtaining real-world information, the UAV 100 can provide sensor information 106 to the user device 110. The user device 110 can receive and display data from the cloud system 120 in which an algorithm driven process combines the received sensor information 106 (e.g., stitch together images of the structure, generate a 3D model of the property, and so on), and the operator 130 can indicate, on the user device 110, areas of the structure 30 of interest, for example, areas that are damaged. The UAV 100 can receive information identifying the areas of interest from the user device 110, and can perform detailed inspections of the areas of interest. The sensor information 106 associated with the detailed inspection can be provided to the user device 110.

The UAV 100 includes a flight control engine 104 that can manage the motors, rotors, propellers, and so on, included in the UAV 100 to effect the flight information 114. Optionally, the UAV application engine 102 can provide commands (e.g., high level commands) to the flight control engine 104, which can interpret the commands to perform the inspection. For instance, the UAV application engine 102 can indicate that the UAV 100 is to descend at a particular location identified as being damaged, and the flight control engine 104 can ensure that the UAV 100 descends in a substantially vertical direction to the area of interest.

After receiving sensor information 106 associated with the detailed inspection of damaged areas, the user device 110 can generate one or more interactive reports 116 describing the damage. The report 116 can be an interactive document (e.g., a web page) that can be provided for presentation on the user device 110 (e.g., in a web browser), or to an outside user device. The report 116 can include a graphical representation of the property (e.g., a dimensioned, graphical map of the rooftop) with damaged areas identified (e.g., highlighted). The operator 130 can indicate types of damage identified, and the report 116 can describe the types of damage, an area of each damaged area, and can provide a reviewing user of the report 116 with access to the raw sensor information 106 for each damaged area. The reports 116 and the sensor information 106 can be transmitted to a remote location where an inspector can view the information in real time. Thus, the operator 130 can concentrate on controlling the UAV 110 while an experienced inspector is reviewing the information. This procedure provides an opportunity for the inspector to request the operator 130 to re-image an area of interest to the inspector. Optionally, the user device 110 or cloud system 120 can determine types of damage from one or more visual classifiers that can operate on the received sensor information 106.

The cloud system 120 can be in communication with a generated reports 129 database that can receive the report 116 and store the report with information describing the report (e.g., information describing the structure, configuration information of the UAV 100, time information associated with the inspection, and so on). Optionally, the cloud system 120 can be in communication with a classifier information 128 database (e.g., one or more databases, or a storage subsystem) that can store information describing one or more visual classifiers (e.g., information utilized by one or more machine learning models, such as support vector machines, k-means clustering, neural networks, and so on, for instance trained by a classifier training engine 124). A reviewing user can review the report 116, and correctly classify the types of damage identified in the sensor information 106. This correctly classified information can be used to update the one or more visual classifiers.

Figure 3:
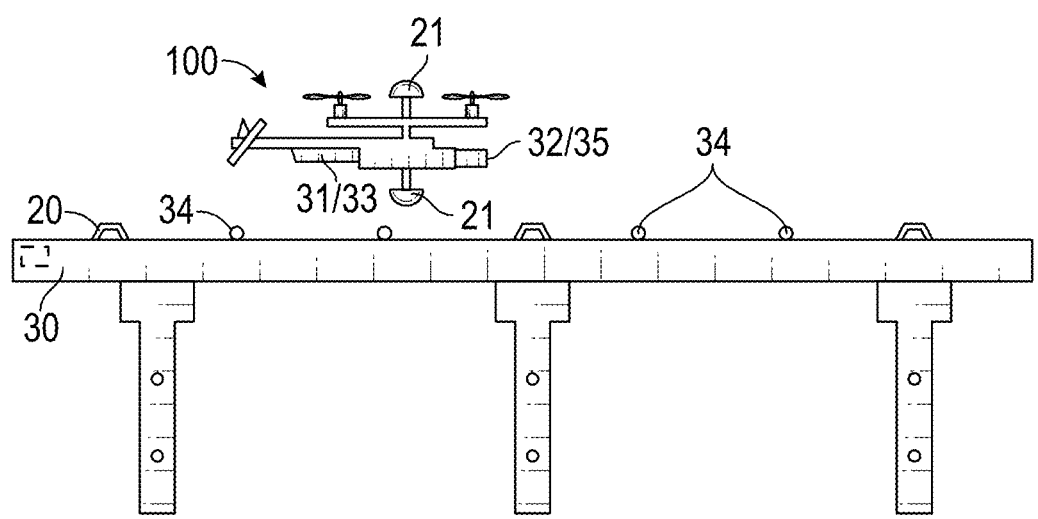
FIG. 3 depicts a perspective view of an embodiment of the system of the present disclosure inspecting a bridge structure.

Referring to FIG. 3, there is shown an example of the UAV 100 in the form of a drone performing inspection of a property 20 in the form of three-dimensional structure 30 such as a building or bridge. In FIG. 3 the structure 30 is a bridge, and the UAV 100 can be controlled remotely by an operator (not shown) who may or may not be on or near the structure 30. Certain features and components of the system and method are described in more detail with respect to the block diagrams of FIGS. 4 and 5, which features, and components may have similar or same functions and benefits as the features and components described above with respect to the embodiment shown in FIG. 1.

In an embodiment, the UAV 100 can comprise a position tracking system 3 and pattern recognition and image analysis software. The system can also comprise a computing system and database, wherein the computing system should be understood to receive, store and send any relevant data and perform any relevant calculations or other operations. The computing system is communicably coupled to a processor 23, wherein data is collected using the processor and transferred to the computing system for processing. The processor 23 can be a component or combination of components of the electronic variety such as, but not limited to, circuit boards, wires, and processors necessary to facilitate the translation of electrical input signals into desired effects in the operation of the system. The processor 23 may also be a single microprocessor.

Figure 4:
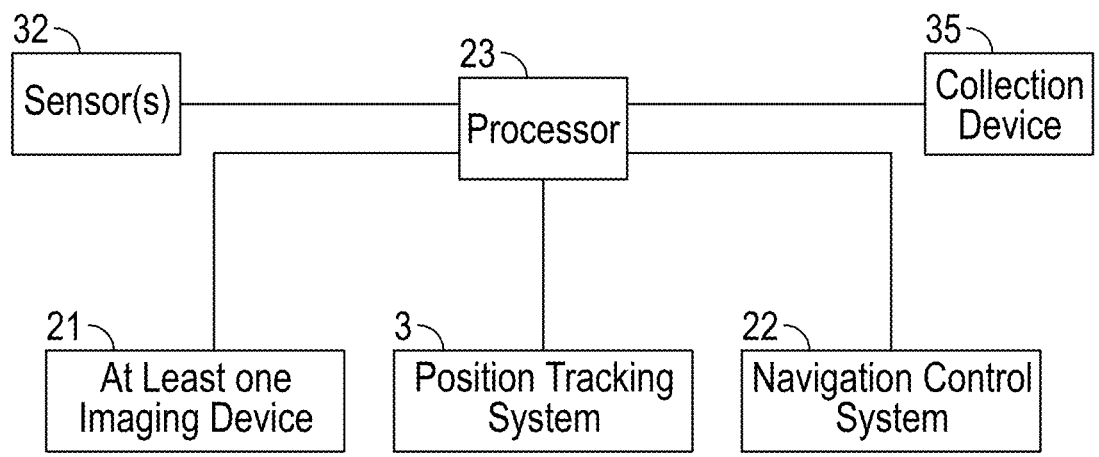
FIG. 4 depicts a block diagram of an example system utilized in performing inspections.
Figure 5:
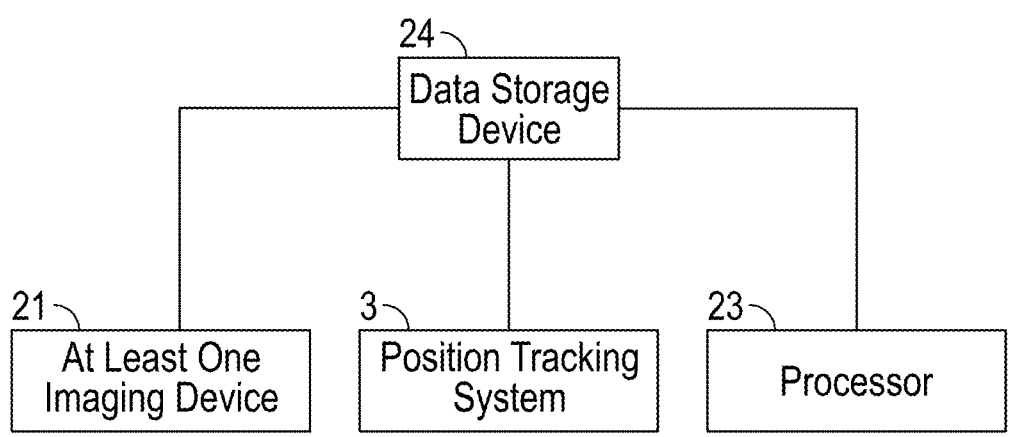
FIG. 5 depicts a diagram showing the electronic connections for a UAV.

The UAV 100 can comprise at least one imaging device 21, a navigation control system 22, the processor 23 and a data storage device 24 connected as shown in FIGS. 4 and 5. In an embodiment, the UAV 100 is a rotorcraft comprising a hovering system such as, but not limited to, a helicopter or quadrotor type aerial vehicle with the ability to hover and to fly vertically, forward, backward, laterally or any other desired direction. The UAV 100 can be flown (manually or automated) by the navigation control system 22 around the structure 30 while scanning, or continually capturing digital images of surfaces of the structure 30 which can later be used to create a virtual model of the structure 30. The UAV 100 may also comprise additional components and sensors, such as, but not limited to, a lighting fixture, flight stabilizers, a digital display, a control panel, or various data transfer ports, cables or other interface components. The sensors 32 can include, for example, sensors of air quality, radiation, heat, distance and moisture.

In an embodiment of the present disclosure, each of the at least one imaging device 21 is a digital camera, and two digital high definition cameras 21 are shown in FIG. 3. It is contemplated that in alternate embodiments alternate or additional imaging devices may be used, such as, but not limited to infrared spectrum cameras. Ultrasonic technology may also be incorporated if desired. The navigation control system 22 can be integrated with the processor 23 and can comprise any software programming and physical components necessary to control the flight of the UAV 100. In an embodiment of the present disclosure, the data storage device 24 can be a compact solid state drive (SSD) that is physically connected to the processor 23 and other components on the UAV 100. In an alternate embodiment, the data storage device 24 may be located in a separate ground based computer to which data is transferred wirelessly.

The present invention also comprises a computing system and database, wherein the computing system should be understood to receive, store and send any relevant data and perform any relevant calculations or other operations. The computing system is communicably coupled to the processor 23, wherein data is collected using the processor 23 and transferred to the computing system for processing. The computing system and database can be implemented in the cloud system 130 or be in a remote office where inspectors can review the information being generated.

The position tracking system 3 can track the position of the UAV 100 in real time, and performs in conjunction with the navigation control system 22 to enable the UAV 100 to be flown in a desired scan pattern around the structure 30.

Referring to FIG. 4, the at least one imaging device 21, the navigation control system 22 and the position tracking system 3 are electronically connected to the processor 23 for signal exchange. Referring to FIG. 5, the position tracking system 3, the at least one imaging device 21, and the processor 23 are electronically connected to the data storage device 24 for signal exchange. Any electronic components requiring electronic power are also electrically connected to a power source (not shown), which is preferably a rechargeable or replaceable battery carried by the UAV 100. Alternatively, the UAV 100 may conceivably be supplied with electrical power through a physical electrical cable connecting the UAV 100 to a stationary power source positioned on the ground or elsewhere near or around the structure 30. Alternatively, the UAV can be powered for flight by hydrogen or other lighter-than-air gases. Complementary data can be collected using additional sensors (such as infrared cameras 31 or laser scanners 33) mounted on the same UAV 100 platform or additional platforms capable of detecting and registering position tracking system targets 34 as shown in FIG. 3. Additional data can be collected by other types of sensors 32 (discussed above) and/or collection devices 35 connected to and controlled by the processor 23. For example, the sensor 32 could detect suspended particles in the surrounding air and the collection device 35 could collect a sample of the air for subsequent analysis.

In an embodiment of the present invention, the position tracking system 3 can be an indoor global positioning system (iGPS) comprising a positioning and orientation sensor and a plurality of position reference targets. The positioning and orientation sensor 31, 33 can be mounted on the UAV 100 and the plurality of position reference targets 34 can be distributed on the structure 30, wherein at least two position reference targets can be within view of the UAV 100 at any given time. The current position of the UAV 100 can be calculated by triangulation with the position reference targets. The current position can be used by the navigation system to maintain a correct scan pattern and can also be linked to each image taken by the at least one imaging device 21.

An embodiment of the method and system of the invention can be understood in the following discussion of FIGS. 8-15 and by following the description of the flowchart shown in FIGS. 6 and 7. Many steps of the method and system components described in this embodiment, such as an initial login, are described as part of a secure system, but, as can be understood by the skilled person, are not necessarily required in general for an inspection system.

Figure 6:
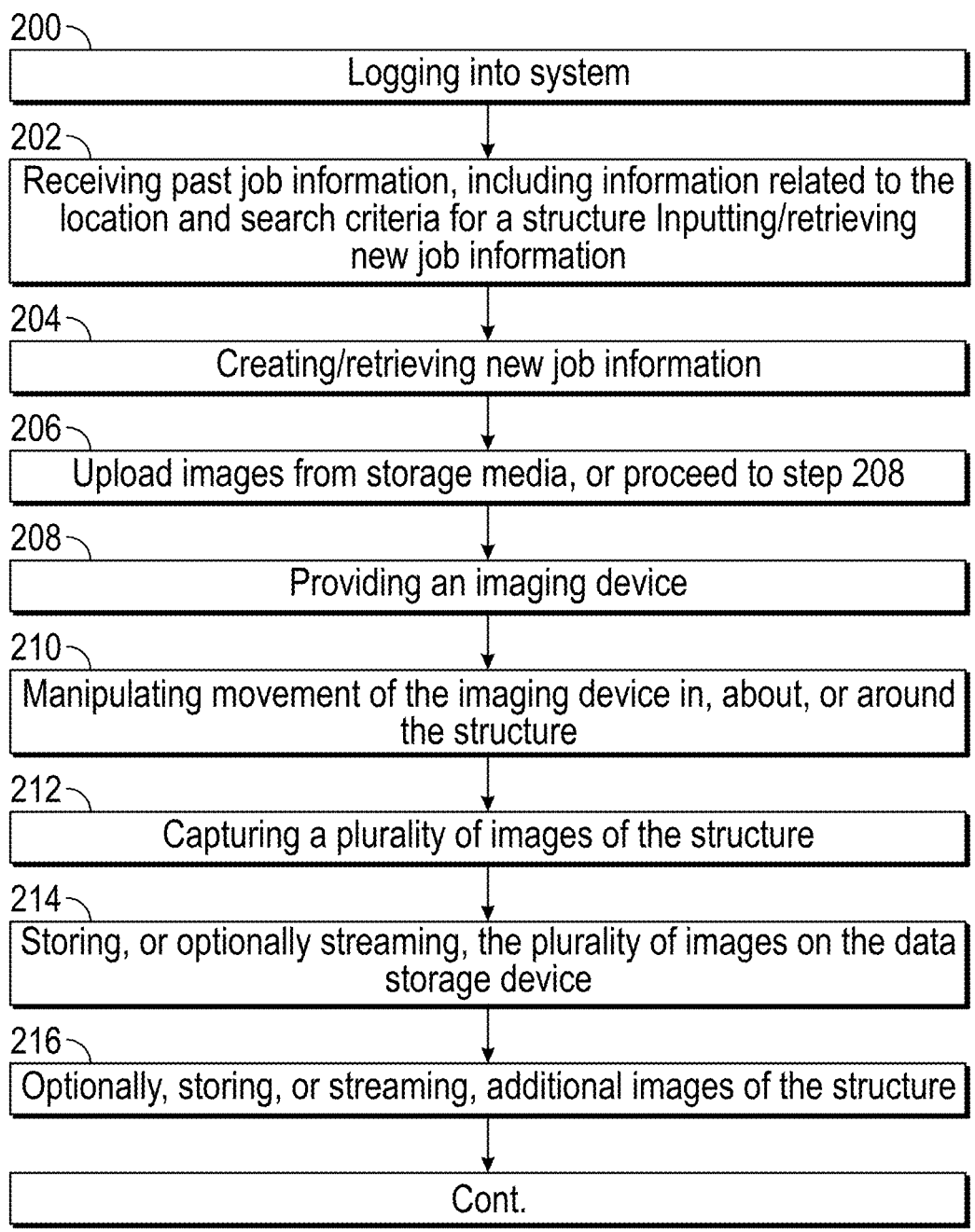
FIG. 6 depicts flowchart of an embodiment method of the present disclosure.
Figure 8:
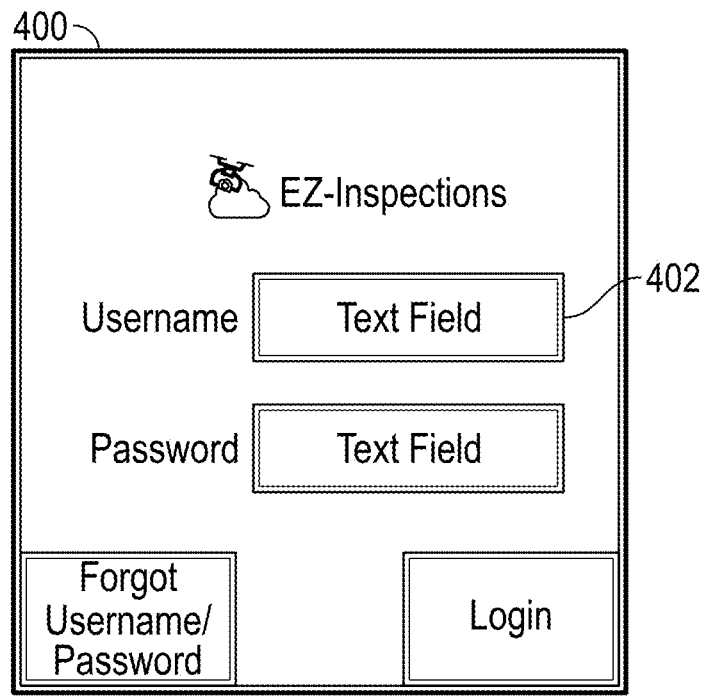
FIG. 8 depicts a representative screen shot of an embodiment system.

At step 200 of FIG. 6, a user can log into to the inspection system, using a login screen 400 as shown in FIG. 8. The login screen 400 can have text fields 402 for secure login, such as username and password entry, as well as system help features, such as retrieving forgotten credentials.

Figure 9:
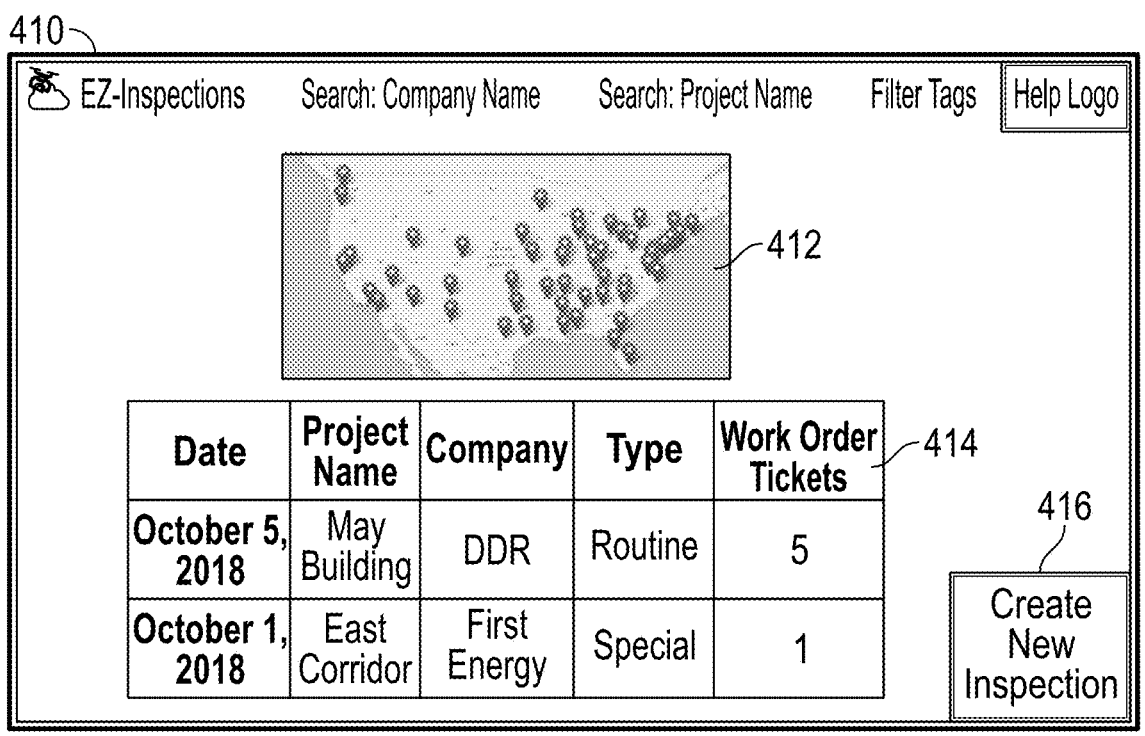
FIG. 9 depicts a representative screen shot of an embodiment system.

Once logged in, a user can access a dashboard screen 410, as shown in FIG. 9. At the dashboard screen 410, and at step 202 of FIG. 6, a user can perform various administrative functions, including, for example, searching for past inspection projects. At step 202 the system can receive job information, including, for example, the location of a structure to be inspected, the time of inspection, the extent of inspection, and any other information relevant to the inspection process, including any obstructions, known defects, and reporting criteria. The job information can be received electronically directly or wirelessly via, for example, the internet. Job information can be received on paper and manually input into the system for uploading and use.

Searching on dashboard screen 410 can be by client/company name, project name, or outcome filter tags set up by the user. In an embodiment, as shown in FIG. 9, a map 412 can indicate with "pins" the location of past inspection projects. The map 412 can be interactive, zoomable, and selectable, so that individual inspection projects can be selected, and information related thereto retrievable. Also, as shown in FIG. 9, a table 414 can be displayed listing past inspection projects. The table 414 can be queried by scrolling, filtering by header, or searched. Thus, a user can access inspection project information by clicking (or tapping or otherwise selecting) on either the map pin or the table entry.

At the dashboard screen 410 a user can also select an option 416, indicated in FIG. 6 at step 204, to create or retrieve information for a new inspection project to process by the system. A user can enter new project information manually in the text fields provided.

Figure 10:
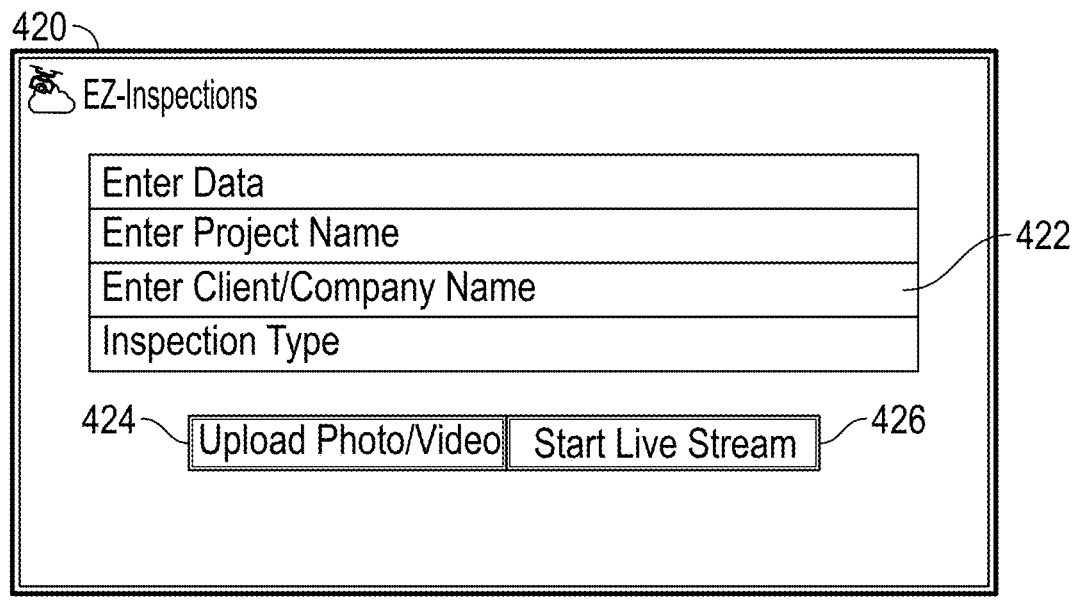
FIG. 10 depicts a representative screen shot of an embodiment system.

At the dashboard screen 410 where a user can select to create or retrieve information for a new inspection project 416, the user can be directed to a new inspection data entry screen 420, as shown in FIG. 10, with text fields 422 related to a new inspection project. At the screen 420 a user can choose to upload 424, as indicated at step 206 in FIG. 6, photos and/or videos not yet uploaded into the system, for example by uploading them from an SD card from a UAV. At the screen 420 a user can also select to start a live stream 426 of an in-process image collection process. Once uploaded and/or stored, the images can be post-processed, for example, by running image analysis software as disclosed herein and indicated at FIG. 7 at step 220.

If new images are required for a new inspection process, an imaging device can be provided for image capture of the subject structure, as indicated at step 208 of FIG. 6. As discussed above, the imaging device can be a digital camera. The digital camera can be handheld or mounted on a UAV. At step 210 the imaging device can be manipulated to move about, in, around, or through a structure for imaging. If the imaging device is handheld, a person can simply walk around, in, about, through, etc., a structure while capturing still or video digital images. In an embodiment, a handheld device can include a device mounted on an extension, such as a pole. If the imaging device is mounted on a UAV, as described above, the UAV can be flown in a pattern sufficient to capture enough images to provide effective inspection.

At step 212 a plurality of images of the structure are captured by the imaging device. Capturing of images can be on the imaging device, and can include capturing 2D images and video images. At step 214 the plurality of images can be stored on data storage media and/or on a data storage device, or, optionally, streamed to a viewing or storage system/device.

At step 216, optionally, additional digital images can be stored or streamed. For example, it may become evident that an initial image capture reveals an area of the structure of particular interest for which additional images are captured.

Figure 7:
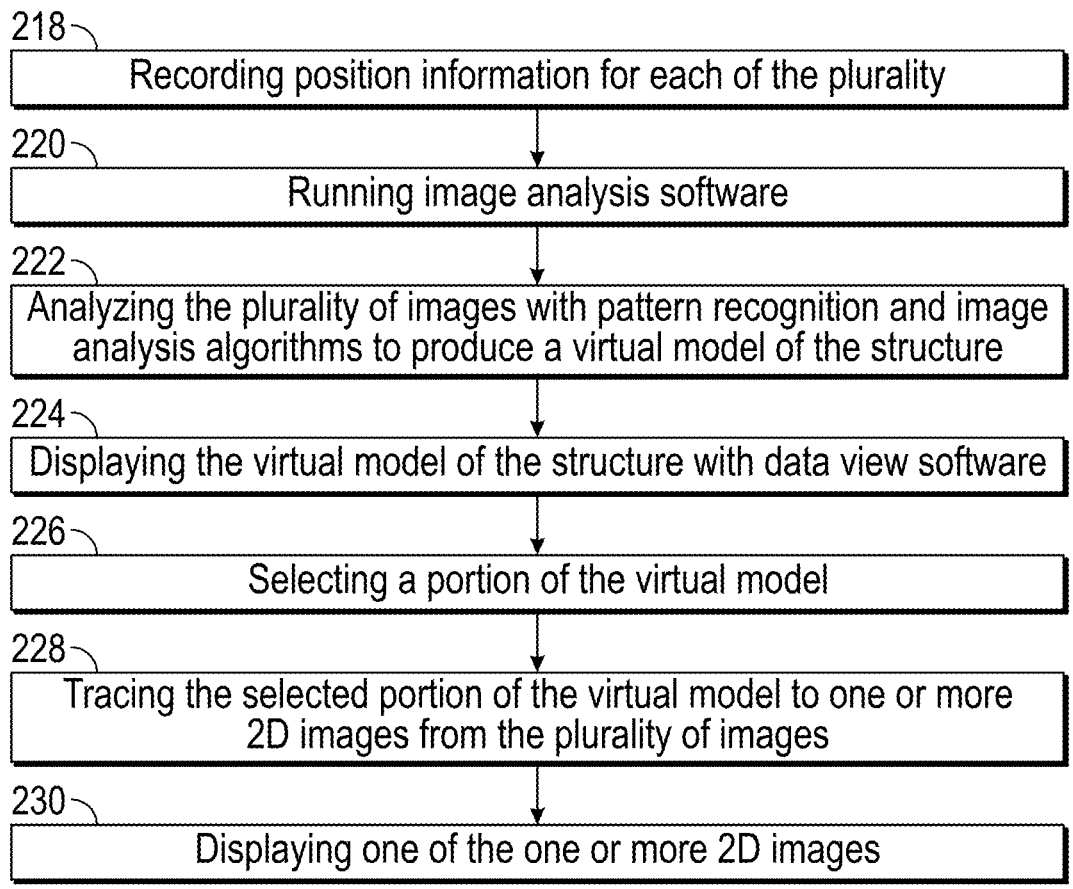
FIG. 7 depicts a continuation of the flowchart begun in FIG. 6.

The flow chart continues on FIG. 7. As indicated at step 218, for at least one, and in general, for all the images captured by the imaging device, position information is appended. The position information can be, for example, GPS coordinates. That is, for each image, the position relative to the structure being inspected is appended and searchable/retrievable. In an embodiment, during a Structure From Motion (SFM) process, all the still, 2D, images are saved, and each can have associated therewith a position coordinate, or other locator, that can be stored in a data file. Once the 2D images are used to make a point cloud and an "unreal" 3D rendering of the inspected structure, each 2D image can be retrieved based on a user selecting a location of the 3D rendering. That is, as discussed below, a user can see what appears to be a defect, or other area of interest, on the virtual 3D model, select that area, and have retrieved from a data file one or more actual 2D images corresponding to the location selected. The 2D images are actual images taken by the imaging device and have the resolution of the original imaging device with respect to pixel size and density.

Figure 11:
FIG. 11 depicts a representative screen shot of an embodiment system.

At step 220 image analysis software is run. The image analysis software Standard SFM software can be utilized to convert 2D images to a 3D rendered model. In an embodiment, the image analysis software includes in step 222 analyzing a plurality of images with pattern recognition and image analysis algorithms to generate a textured mesh and/or 3D point cloud virtual model 430 of the inspected structure from the still images, as shown in FIG. 11. The 3D point cloud can be generated from any image source, e.g., human photos, aircraft photos, satellite photos, drone photos, or videos from any of these sources. In an embodiment, the 3D point cloud generates an "unreal" but approximate virtual model 432, while maintaining the integrity, identification, and searchable data of the source images, e.g., the still (or 2D) images. Each of the still images can, therefore, be retrieved by selecting a portion of interest on the unreal, approximate virtual model 432.

The virtual model 430 screen is displayed at step 224 of FIG. 7 and is viewable in three dimensions, zoomable, and otherwise open to inspection on a display screen by an inspector who can enlarge, rotate, and otherwise view and pinpoint locations of interest. The virtual model 432 can be "stitched" from 2D images captured by the imaging device as it was manipulated about the structure to be inspected.

Because each of the still "2D" images captured by the imaging device and processed by the image analysis software has position information appended thereto, a user can click (tap, or otherwise select) at step 226 a portion of the stitched 3D virtual model, and the system of the present disclosure can identify and trace, as indicated at step 228, one or more 2D images of the selected portion, and present these 2D images to the user, as indicated at step 230. In this manner, an inspector can closely inspect 2D images of potential defects, rather than 3D renderings of the potential defects. The 2D images can be generated to resolutions limited only by pixel size and density.

The advantages of being able to extract actual 2D images from a virtual 3D rendered stitched model of an inspected structure include better resolution, more "clear" image for AI processing such as defect detection.

Figure 12:
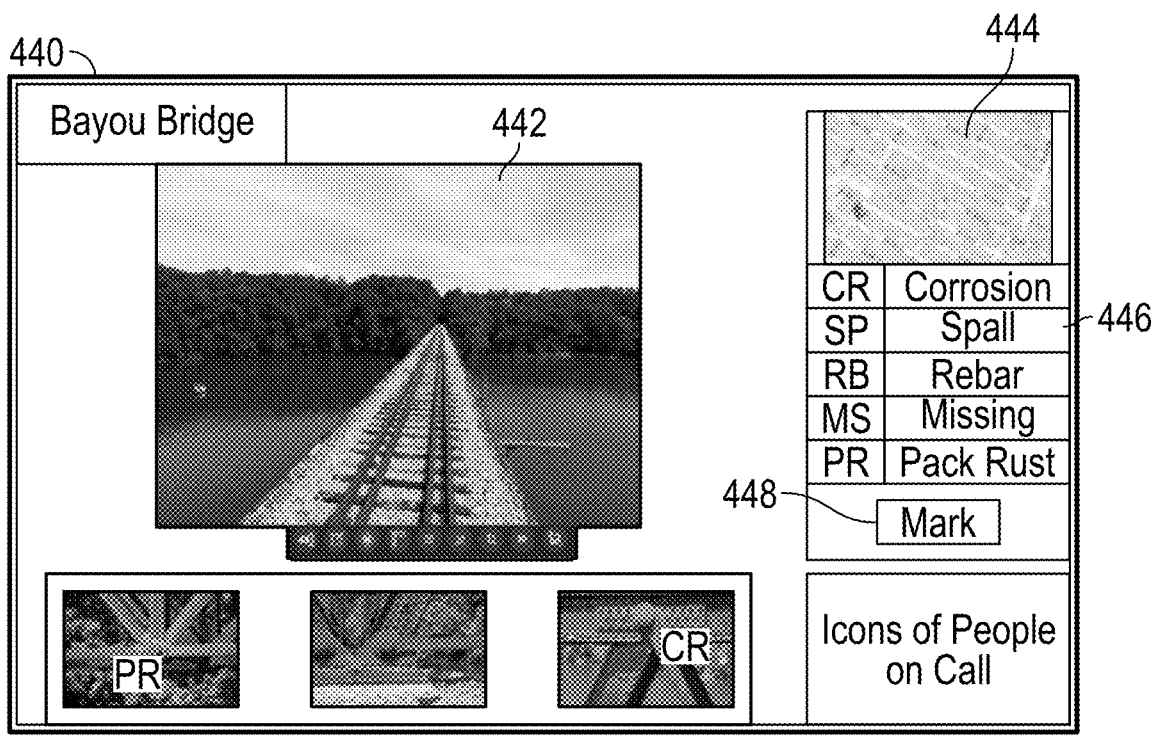
FIG. 12 depicts a representative screen shot of an embodiment system.
Figure 13:
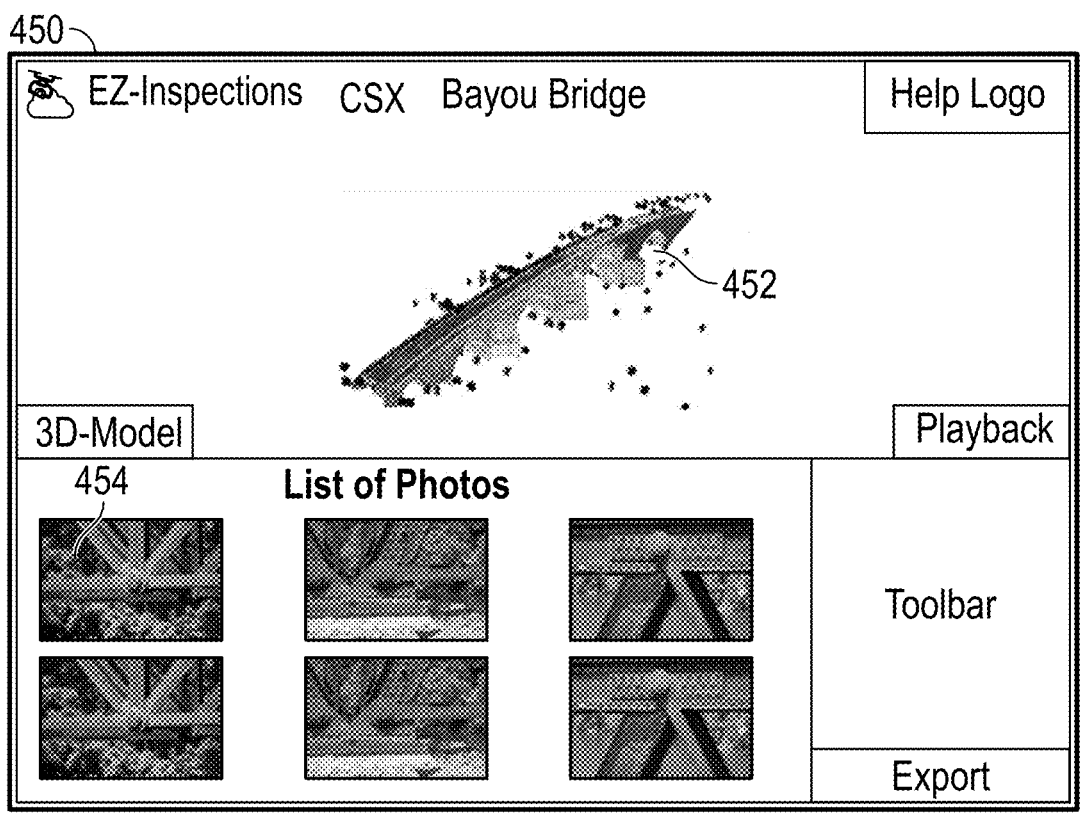
FIG. 13 depicts a representative screen shot of an embodiment system.
Figure 14:
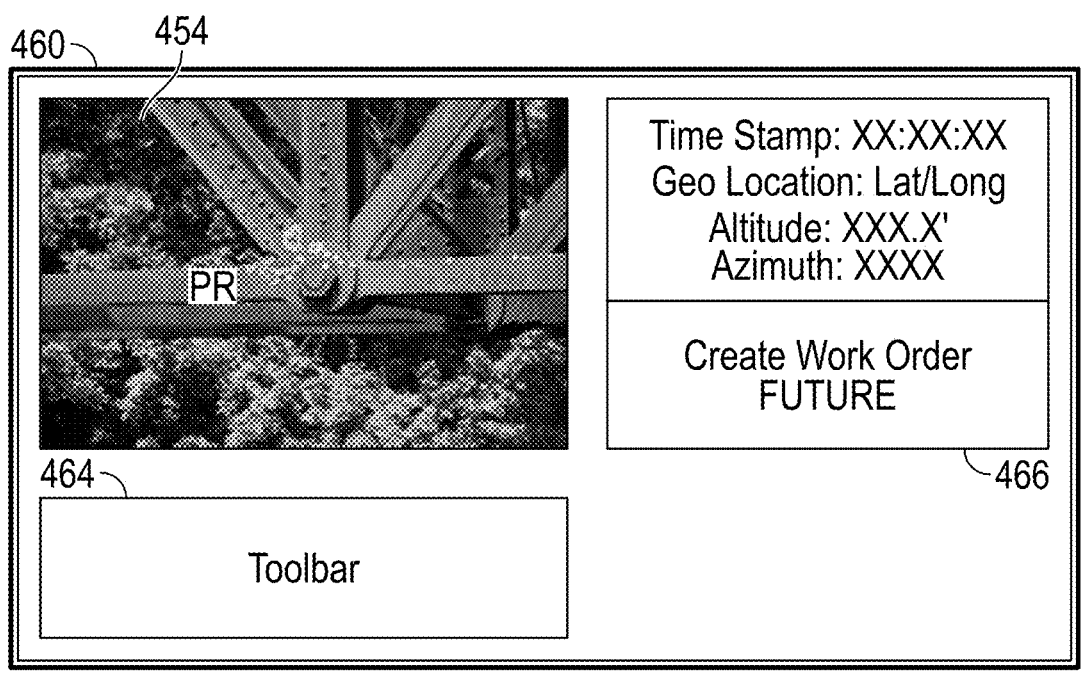
FIG. 14 depicts a representative screen shot of an embodiment system.

In another embodiment, as indicated in FIGS. 12-14 showing a representative bridge inspection, the inspection system can be livestreamed, and a user can, while livestreaming video is being viewed, select portions from which a user wishes to now or later view a still image for further inspection. For example, as shown in FIG. 12, the system user device can include a screen 440 showing a live stream video 442 from the imaging device, i.e., from a UAV in motion. A map inset 444 can show the geographical location of the UAV, and a selection table 446 can show pre-populated, or customizable inspection criteria for a user to note by selecting. A toolbar (not shown) can provide for optional selections, including various administrative tasks associated with the inspection process. A button 448 is provided for the user to actuate to mark a point of interest in the video. The mark includes the elapsed video time, a reference to the corresponding still photo and the inspector comment.

As shown in FIG. 13, after a user completes a livestream or uploads images (photos or videos), or in an embodiment, selects a past project, a screen 450 displays a 3D virtual rendering of the structure 452, in this case a bridge. The 3D virtual model can be a rendering of stitched still images that have been post-processed by the image analysis software, as described above. In an embodiment, as shown in FIG. 13, on the screen 450 showing the 3D virtual model there can also be displayed still photos or video 454 from selected portions of the 3D virtual model. The still images can be actual images pulled from the 3D virtual model by virtue of each still image having appended thereto location information related to the structure being inspected, as discussed above. For example, one of the still images 454 can be displayed as a result of being marked as described above.

If a user selects one of the still images 454 shown on the screen 450, the image can be shown separately and enlarged on a separate screen 460, as shown in FIG. 14. The display of the screen 460 can include time and location information 462, as well as inspection-specific information that can be inputted and stored by the user using a toolbar 464. For example, the user can input an identified defect, a proposed correction, and submit the information as a work order 466 for remedial correction of the inspected structure.

In an embodiment, in addition to, or instead of, inspection capability a UAV of the present disclosure can have structure measurement capability. That is, the UAV can be utilized to measure distances on structures, including dimensions of defects, distances between defects in structures, and other dimensional measurements. In an embodiment, the measurement capability described herein can be practiced independent of a UAV, but the disclosed embodiment includes a UAV in the form of a drone.

In an embodiment, a UAV with measurement capability utilizes data received by the UAV from detectable media that has impacted, e.g., shown or illuminated, on the structure. Impact can be by light (e.g., flashlight, laser), water (e.g., water jet), sound, or other projected medium (e.g., pellets, nerf "bullets"). That is, in general, a projected medium can include anything such as a particle or and electromagnetic particle, photo-based particle, or a wave of such, that detectably impacts an object, e.g., a structure, a region, a space (e.g., smoke), and for which a geometric center point can be located in a frame of reference, and the geometric center point can be translated into an image, such as photograph, including a digital image.

In an embodiment measurement capability uses light as a medium, and the light can be projected by one or more lasers. A laser can be any of known lasers, and can be visible, IR, multi-spectral, and the like. In an embodiment the lasers are mounted on a UAV, and operably connected via processors to UAV components, including an imaging device. In general, the more lasers utilized the more accurate any given measurement can be. One or more lasers can be mounted directly to the UAV, or they can be mounted to a digital camera on the UAV, or to a gimbal on the UAV. In an embodiment, the lasers can be independent of the UAV, but have their impact area on an imaged structure in view of the digital imaging device on the UAV. In general, lasers supply detectable reference points that can be captured by image capture devices and analyzed with image analysis. Once reference points are identified on an image, the distance between center points can be calculated, for example, by utilizing the known information related to the pixels of a digital image and with reference to the pixels per inch of the image.

Figure 15:
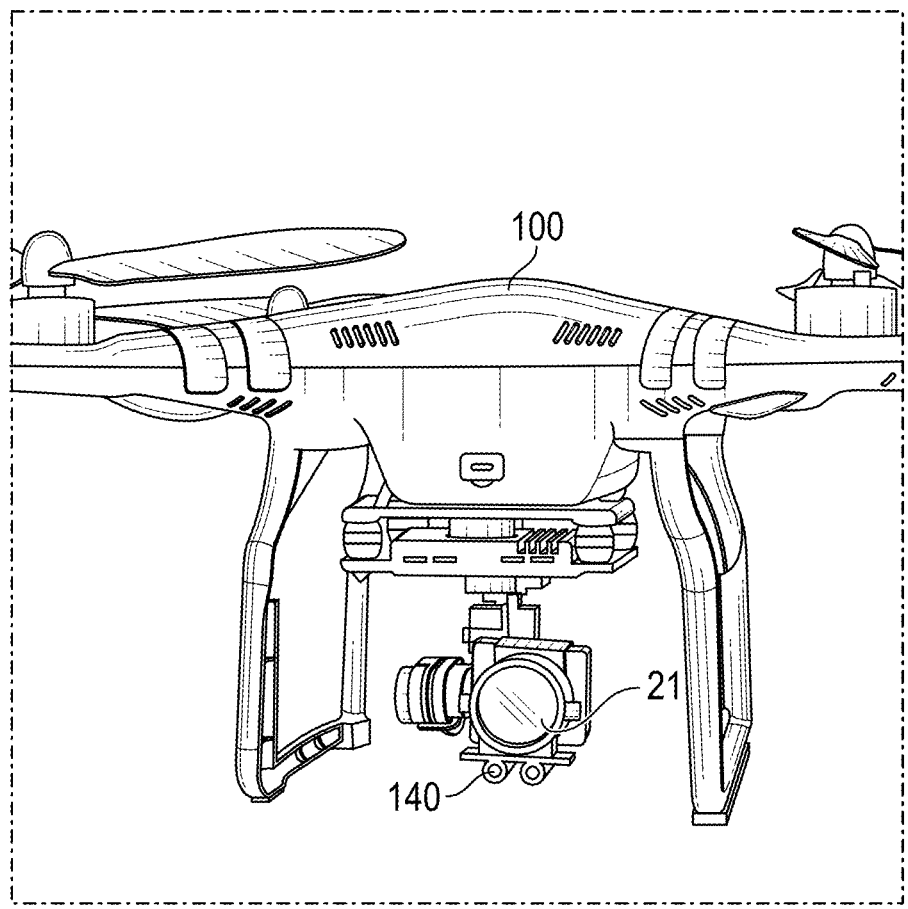
FIG. 15 depicts a representative drone having lasers mounted thereon of an embodiment system.

Referring now to FIG. 15, there is shown an example of the UAV 100 in the form of a drone, on which are mounted two lasers 140 in addition to the imaging device 21. The lasers 140 can be relatively lightweight and mounted such that they do not negatively impact the UAV's operation. In an embodiment, the lasers 140 can be mounted such that they do not alter the center of gravity of the UAV 100. In an embodiment, lasers 140 can be mounted to a motion gimbal to permit relative movement between the UAV body, the imaging device 21, and the lasers 140. In an embodiment, the lasers 140 can be manipulatable to be substantially orthogonal to the surface being imaged. In an embodiment, lasers 140 can be centered along a horizon of a particular application to support level operations.

Figure 16:
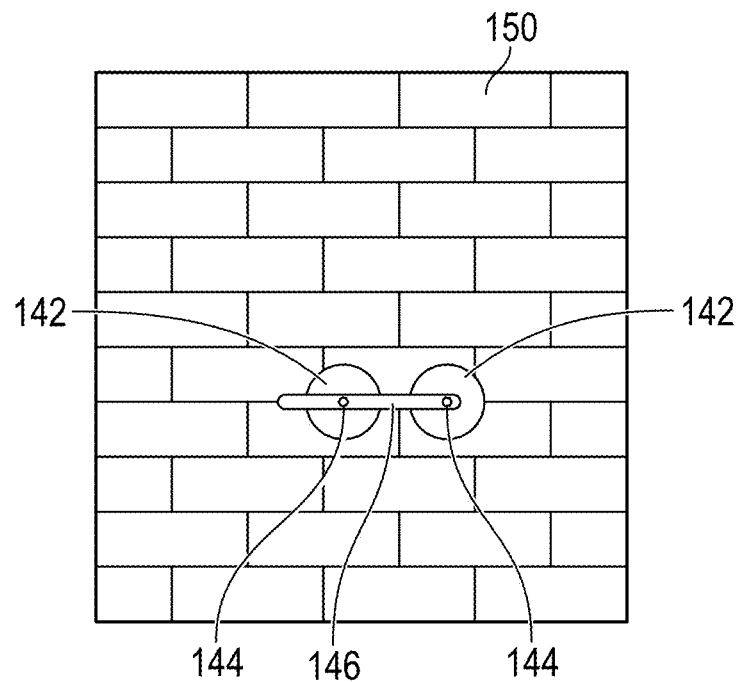
FIG. 16 depicts a representative structure having a feature of interest to be dimensionalized.

In operation, the measurement capability of the present invention can be described generally in the context of data gathering and data analysis. Data gathering for measurement of dimensions of structural features such as defects includes imaging the structure as described above. In addition to gathering images that can be stitched into a 3D virtual model, however, at least one, and in this description, two lasers 140 are also beamed onto the structure along with the image gathering, so that the images include the detectable effects of the laser impingement on the structure being imaged. For example, as shown in FIG. 16, a representative structure 150 in the form of a brick wall can have a defect, such as crack 146. During the imaging of the brick wall, two laser beams can impinge on the brick wall 150, resulting in detectable impingement regions 142, which each include a center point 144. The distance between the two center points 144 can be known based on the spacing of the lasers on the UAV, and/or from a calibration step as described below.

Figure 17:
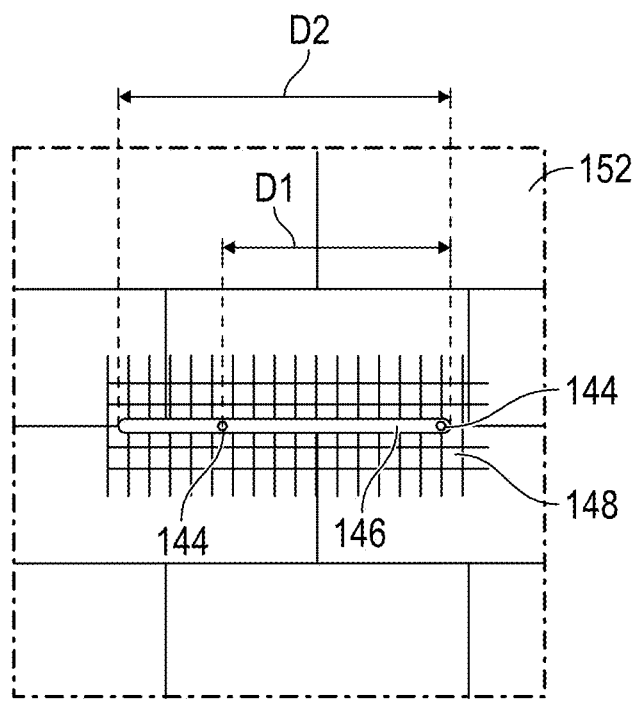
FIG. 17 depicts a representative image of representative structure having a feature of interest to be dimensionalized.

The dimensions of structural feature, such as the crack 146 in FIG. 16, can be determined in an analysis step, as described with reference to FIG. 17. FIG. 17 shows an image 152, such as a digital photograph, of the portion of interest of an imaged structure 150 described with reference to FIG. 16, including the crack 146. The image 152 includes the crack 146 and the center points 144 of the laser impingement regions 142. The distance D1 between the center points 144 is a known quantity based on the spacing of the lasers 140, and/or calibration of the lasers. The image 152 can consist of a plurality of pixels 148, and the image can have a known pixel density, e.g., pixels per inch, such that each pixel represents a quantifiable distance overlaid on the imaged structure. Thus, the number of pixels 148 between the center points 144 can be ascertained. Based on the quantification of distance in pixels between the center points 144, the dimension of crack 146 can be likewise extrapolated to quantify its dimension D2 in inches, for example. As can be understood from the forgoing description, any number of lasers and center points can be utilized, with the dimensions of features in structures being geometrically quantifiable based on the extrapolation of pixel data on imaged features to inches (or, of course, any other unit of interest such as meters, radians or degrees).

In an embodiment, an operator can visually identify a feature, determine the pixel density, and visually and manually calculate the extrapolated dimensions. In an embodiment, dimensional analysis can be automated, and processors can identify and quantify dimensions of features.

In an embodiment, a UAV such as a drone can have lasers calibrated prior to use. One method of calibration can include setting up the lasers to project substantially parallel light beams. The UAV can then image a calibration feature having known dimensions on a calibration structure at a distance of 1 foot, 2 feet, and 3 feet, and calculate dimensions of the calibration feature at each distance. Prior to operating the UAV in a structure inspection, an operator can likewise choose a feature and image it at 1 foot, 2 feet, and 3 feet to ensure that the laser orientation has not changed prior to inspecting a structure.

Viewing the gathered data can be analyzed manually by viewing on an electronic screen, and the analyzed data can be presented in a numerical manner, such as in Excel spreadsheet. In an embodiment, the electronic device on which images are viewed can have an auditory or visual indication of viewable features that can be dimensionally quantified.

In an embodiment, an operator can review a 3D rendering of an imaged structure, identify features of interest, such as structural defects, select such features (such as by clicking on an image projected on an electronic device), and have the dimensions of the selected features determined in a separate step, and, in an embodiment, by a separate entity. That is, in an embodiment, an operator using a UAV drone to inspect a structure may not have access to the capability of dimensionalizing features of interest, and this dimensionalizing can be carried out by a separate entity. In an embodiment, an operator using a drone with lasers for measurement of structural features can send gathered data to a third party entity, and the third party entity can analyze the gathered data as described herein.

In an embodiment, an operator reviewing the 3D model can identify a feature on a structure, e.g., a defect such as a crack, and select, e.g., with a mouse click, on the 3D image to bring up the corresponding 2D images of the portion of the structure having the feature. On the 2D image can be included the two (or more) laser dots. Because the spacing of the laser dots can have been previously calibrated, the spacing of the laser dots can be a known dimension. In an embodiment, a radio button, or other selectable feature can be visible on the screen such that a user can select a "calibrate" function for the given 2D image, and for that image, calibration for this 2D image can be determined based on original calibration data. Then, a user can use an additional selection tool to select discrete places on the 2D image, and with each selection after the first, the software can analyze and calculate an actual distance dimension between any two places. For example, if a crack length is to be measured, a user can click on one end of the crack, click on the other end of the crack, and be presented with an actual distance dimension of the crack length.

Figure 18:
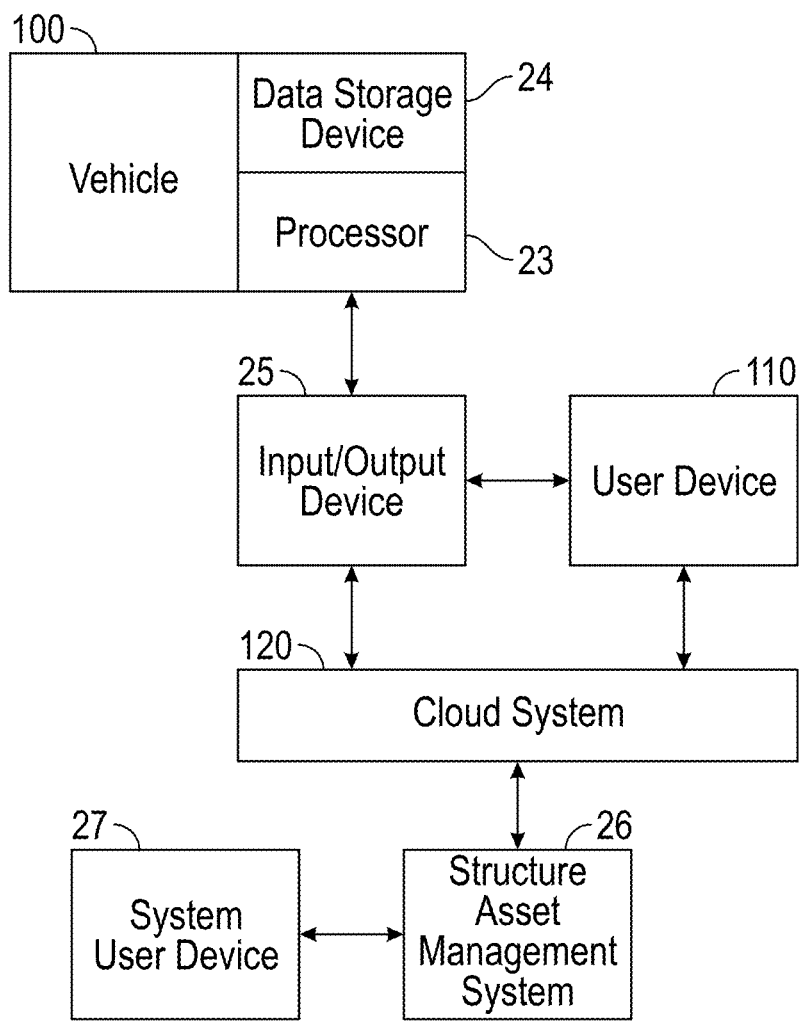
FIG. 18 depicts a block diagram an embodiment of the system of the present disclosure including a structure asset management system according to the invention.

FIG. 18 depicts a block diagram of the structure inspection system of the present disclosure including a structure asset management system according to the invention. The previously described UAV 100 carrying the processor 23 and the data storage device 24 also has and input/output device 25 connected to the processor 23. The input/output device 25 communicates with the hand-held user device 110 wirelessly or by a wired connection. The user device 110 communicates with the cloud system 120 for exchanging information as can the input/output device 25. Also in communication with the cloud system 120 is the structure asset management system 26. The structure asset management system 26 captures all of the images and data generated from the imaging device(s) 21, the sensors 31/32/33 and the position tracking system 3. The system 26 also receives the reports 116 generated by the user device 110. The system 26 can analyze the images and the data and make all information regarding the structure being inspected available to any authorized system user a mobile or desktop application running on a device 27 connecting to the system 26. This information includes the images, administrative information, reports, and maintenance schedules. The system users include the owners and operators of the structure assets, the engineers and data analysts who evaluate the information, and the pilots and inspectors that collect the information.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. It is hereby intended the scope of the invention to be defined by the claims appended hereto.

LIST OF REFERENCE SIGNS 3 position tracking system
20 property
21 imaging device
22 navigation control system
23 processor
24 data storage device
25 input/output device
26 structure asset management system
27 system user device
30 three-dimensional structure, building, bridge
31 infrared camera
32 sensor
33 laser scanner
34 position tracking system target
35 collection device
100 vehicle, UAV, drone
102 UAV application engine
104 flight control engine
106 sensor information
110 hand-held user device
112 application engine
114 flight information
116 interactive report
120 cloud system
122 job determination engine
124 classifier training engine
126 job information
128 classifier information database
129 generated reports database
130 operator
132 user input
140 lasers
142 detectable impingement regions
144 center point
146 defect, crack
148 pixels
150 structure, brick wall
152 image
200 user log in
202 perform various administrative functions
204 create/retrieve new job information
206 upload photos and/or videos
208 provide imaging device
210 manipulate imaging device
212 capture plurality of images
214 store or stream plurality of images
216 optionally, store or stream additional digital images
218 record position information
220 post-processed by running image analysis software
222 analyze images
224 display virtual model screen
226 select portion of the stitched 3D virtual model
228 identify and trace one or more 2D images of the selected portion
230 display 2D images
400 login screen
402 text fields for secure login
410 dashboard screen
412 map location of past inspection projects
414 table listing past inspection projects
416 option create or retrieve information for a new inspection project
420 new inspection data entry screen
422 text fields
424 upload
426 start a live stream of an in-process image collection process
430 textured mesh and/or 3D point cloud virtual model
432 generate approximate virtual model
440 screen
442 live stream video
444 map inset
446 selection table
448 mark button
450 screen
452 3D virtual rendering of the structure
454 still photos or video from selected portions of the 3D virtual model
460 separate screen
462 time and location information
464 toolbar
466 work order
D1 distance between center points
D2 dimension of crack 146

The invention claimed is:
1. A method for structure inspection, the method comprising the steps of:
selecting a structure having a surface to be inspected;

providing a vehicle having an imaging device for generating two-dimensional digital images of the surface;
providing a user device on which digital images can be viewed;
moving the vehicle in proximity to the structure;
generating digital images of a plurality of portions of the surface using the imaging device and, for each of the digital images, generating associated position information relating a position of the imaging device relative to a one of the portions of the surface represented by the digital image;
storing the digital images in a data storage device, wherein each of the digital images includes the associated position information;
producing a three-dimensional virtual model from the stored digital images;
displaying the three-dimensional virtual model on the user device;
selecting a location on the displayed three-dimensional model through the user device;
using the selected location on the three-dimensional model to identify a corresponding one of the stored position information associated with at least one of the digital images; and
displaying the at least one of the digital images associated with the corresponding one of the stored position information on the user device.

2. The method according to claim 1 including moving at least one of the vehicle and the imaging device in a predetermined pattern to generate the digital images for all areas of interest of the surface.

3. The method according to claim 2 including responding to user input through the user device by at least one of adding to, subtracting from, modifying and repeating at least a portion of the predetermined pattern.

4. The method according to claim 1 wherein the user device is a hand-held user device used by an operator of the vehicle or is a system user device.

5. The method according to claim 1 including generating each of the digital images as a frame of a live streaming video.

6. The method according to claim 5 including operating the user device to mark at least one point of interest in the video, the mark including an elapsed time of the video associated with the mark, a reference to the corresponding stored position information and a user comment.

7. The method according to claim 1 including the steps of:
providing a pair of lasers on the vehicle; operating the lasers to project parallel light beams onto a feature of interest of the surface; generate a two-dimensional digital image of the portion of the surface including the feature of interest and center points of the light beams impinging on the surface; and determining a dimension of the feature of interest based upon at least one of a known spacing between the center points and a pixel density of the digital image.

8. The method according to claim 1 including generating a report of a damaged area of the surface including at least one of a description of the damaged area, a graphical representation of the structure with the damaged area identified, a description of a type of damage at the damaged area, and at least one of the digital images including the damaged area.

9. The method according to claim 1 including producing the three-dimensional virtual model using photogrammetry techniques to stitch the digital images together.

10. The method according to claim 1 wherein the associated position information includes GPS coordinates of the imaging device.

11. A method for structure inspection, the method comprising the steps of:
moving a vehicle in proximity to a structure, the vehicle having an imaging device generating digital images of a predetermined surface of the structure as a live stream video;
providing a user device on which the video can be viewed;
generating the video including a plurality of portions of the surface using the imaging device and, for each of the digital images, generating and including associated position information relating a position of the imaging device relative to a one of the portions of the surface represented by the digital image;
operating the user device to mark at least one point of interest in the video, the mark including an elapsed time of the video associated with the mark, a reference to the corresponding digital image and a user comment; and
producing a three-dimensional virtual model from the digital images; displaying the three-dimensional virtual model on the user device; selecting a location on the displayed three-dimensional model through the user device; using the selected location on the three-dimensional model to identify a corresponding one of the position information associated with at least one of the digital images; and displaying the at least one of the digital images on the user device.

12. The method according to claim 11 including producing the three-dimensional virtual model using photogrammetry techniques to stitch the digital images together.

13. The method according to claim 11 wherein the user device is a system user device and including using the system user device to instruct an operator of the vehicle to move at least one of the vehicle and the imaging device to generate digital images from selected areas of the surface.

14. A non-transitory computer program product comprising at least one computer program means for performing the method according to claim 11 when the computer program means is loaded into at least one processor associated with a structure asset management system in communication with the vehicle and the user device.

15. A computer-implemented method for structure inspection comprising executing on at least one processor the steps of:
moving a vehicle in proximity to a structure and moving at least one of the vehicle and an imaging device on the vehicle while generating digital images with the imaging device of a predetermined surface of the structure in a predetermined pattern as a live stream video;
for each of the digital images, generating and associating position information relating a position of the imaging device relative to a portion of the surface represented by the digital image;
viewing the video on a user device;
operating the user device to mark at least one point of interest in the video, the mark including an elapsed time of the video associated with the mark and a reference to a corresponding one of the digital images and a user comment;
producing a three-dimensional virtual model from the digital images;
displaying the three-dimensional virtual model on the user device;
selecting a location on the displayed three-dimensional model through the user device;

using the selected location on the three-dimensional model to identify a corresponding one of the position information associated with at least one of the digital images; and displaying the at least one of the digital images on the user device.

16. The method according to claim 15 including a step of associating a comment with the mark.

17. The method according to claim 15 including a step of including GPS coordinates of the imaging device in the associated position information.

18. The method according to claim 15 including producing the three-dimensional virtual model using photogrammetry techniques to stitch the digital images together.

* * * * *